United States Patent
Gutfreund et al.

(10) Patent No.: US 6,192,394 B1
(45) Date of Patent: Feb. 20, 2001

(54) INTER-PROGRAM SYNCHRONOUS COMMUNICATIONS USING A COLLABORATION SOFTWARE SYSTEM

(75) Inventors: Keith Gutfreund, Acton; Matthew C. Corkum, Marlborough; David M. Marques, Chelmsford; Trudilyne Leone, Cambridge, all of MA (US)

(73) Assignee: Compaq Computer Corporation, Houston, TX (US)

(*) Notice: Under 35 U.S.C. 154(b), the term of this patent shall be extended for 0 days.

(21) Appl. No.: 09/114,373

(22) Filed: Jul. 14, 1998

(51) Int. Cl.[7] ................................................. G06F 13/00
(52) U.S. Cl. ............................................................ 709/204
(58) Field of Search .................................. 709/310, 205, 709/204, 206

(56) References Cited

U.S. PATENT DOCUMENTS

| | | | |
|---|---|---|---|
| 5,572,643 | * 11/1996 | Judson | 709/218 |
| 5,590,128 | * 12/1996 | Maloney et al. | 370/260 |
| 5,764,916 | * 6/1998 | Busey et al. | 709/227 |
| 5,987,523 | * 11/1999 | Hind et al. | 709/245 |
| 5,987,608 | * 11/1999 | Roskind | 713/200 |

OTHER PUBLICATIONS

Oikarinen,J. and Reed, D., "Internet Relay Chat Protocol," Network Working Group, pp. 1–65, May 1993 (visited Dec. 18, 1998 <http://www.wdi.co.uk/pirch/rfcl459.htm>).

* cited by examiner

Primary Examiner—Kenneth R. Coulter
(74) Attorney, Agent, or Firm—Hamilton, Brook, Smith & Reynolds, P.C.

(57) ABSTRACT

A new system for communicating between computer programs is disclosed which includes a collaboration software program having a directory publishing procedure and a message forwarding procedure. In an example embodiment, the disclosed system provides a user of a network application program, such as an internet chat program, with an out-of-band mechanism to send invitations to other users of the network application program. A user of the network application program requests a list of all users known to the collaboration software program. The user list is for example a list of user names associated by the collaboration software program with URLs of home pages of users known to or registered with the collaboration software program. The user seeking to send the message then selects a user name and provides a message to the collaboration software program. The collaboration software program then posts the message so that the message can be displayed in the home page of the selected user. For example, the message is displayed in a screen within the window of the browser executing in a client system on which the selected user is working.

16 Claims, 8 Drawing Sheets

INTER-PROGRAM SYNCHRONOUS COMMUNICATIONS USING A COLLABORATION SOFTWARE SYSTEM

FIELD OF THE INVENTION

The invention relates generally to communications between computer software programs implementing a restrictive security model and more specifically to a method and apparatus for synchronous communications between computer software programs which can be securely downloaded from web pages, such as Java™ applets.

BACKGROUND

The wide availability of the Internet permits an ever increasing number of users to download data from remote systems onto their local system. These actions are typically done through a browser software program which forms logical network connections with a remote system, and then uses the Hyper-Text Transport Protocol (HTTP) to move data from the remote system. The data may, for example, describe or consist of a set of Hyper-Text Markup Language (HTML) instructions. Such data frequently indicates or includes computer program code that is ultimately executed on the local machine. For example, the HTML instructions from a remote system may include indication of an "applet" program, written in the Java™ language developed by Sun Microsystems, Inc.

An applet is an example of a program which is typically embedded within a Web page, and which is executed when the Web page is browsed. Several restrictions apply to the design and operation of applets. Some of these restrictions relate to secure operation and execution of the applet on the client system. This arises from a concern most users have regarding the potentially devastating effects which can be caused by execution of poorly or maliciously designed code on their local system. The security restrictions imposed on applets have the result that applets loaded onto a local system from over the network cannot make network connections to hosts other than the host from which they are downloaded from. In addition, unsolicited information cannot be read from or written to the local computer system (hard disk) by an applet downloaded from a remote host. Moreover, applets have no capabilities for directly communicating with other applets. Because of these significant limitations, applets can generally be used for very little other than displaying data or managing user inputs.

Existing systems have thus been able to use applets in very limited ways. The above described restrictive security model for applets provided tight control over information flowing to and from applets, and thus allowed users to be assured that they were safe in loading applets down onto their local system for execution. However, several drawbacks result from the design and use of applets in existing systems.

First, existing systems do not permit a user of a first network application, for example a user of a chat room application, to communicate with another user who is not currently using that same network application, but who is currently running his or her local browser. In addition, existing systems provide no mechanisms for users of a network application, for example a shared whiteboard application, to determine whether or not applets are being run by other users that are potentially communicative with the applet of the local user. This is the consequence of preventing direct communication between applets.

For these reasons and others, it would be desirable to have a system which permits programs implementing a restrictive security model to communicate without otherwise compromising that security model. The new system shall allow such programs to communicate regardless of whether they were downloaded from a common network server, and further regardless of whether they are both currently running a common network application client. In addition, the new system should enable users to determine if other users are currently available for such inter-program communications.

SUMMARY

In accordance with principles of the invention there is disclosed a new system for communicating between computer programs. The disclosed system includes a collaboration software program having a directory publishing procedure and a message forwarding procedure. In an example embodiment, the disclosed system provides a user of a network application program, such as a chat program, with an out-of-band mechanism to send invitations to other users of the network application program who are not currently executing the network application program, but which are logged onto the network, for example through a browser program. The user of the network application program requests a list of all users known to the collaboration software program. The user list is for example a list containing user names associated with users known to or registered with the collaboration software program. The user seeking to send the message then selects one of the other users in the list and provides a message to the collaboration software program. The collaboration software program then maps the selected user name to a URL indicating a home page associated with the selected user name. The URL is for example mapped to the user name internally by the collaboration software program, thus eliminating the need for users to know each other's URLS. The collaboration software program then posts the message so that the message can be displayed in the home page of the selected user. For example, the message is displayed in a screen within the window of the browser executing in a client system on which the selected user is logged in.

In this way there is provided a new system which permits programs implementing a restrictive security model to communicate without otherwise compromising that security model. The new system allows such programs to communicate regardless of whether they were downloaded from a common network server, and further regardless of whether they are both currently running a common network application program. In addition, the new system enables users to determine if other users are currently available for such inter-program communications.

DETAILED DESCRIPTION OF THE PREFERRED EMBODIMENTS

Figure 1:
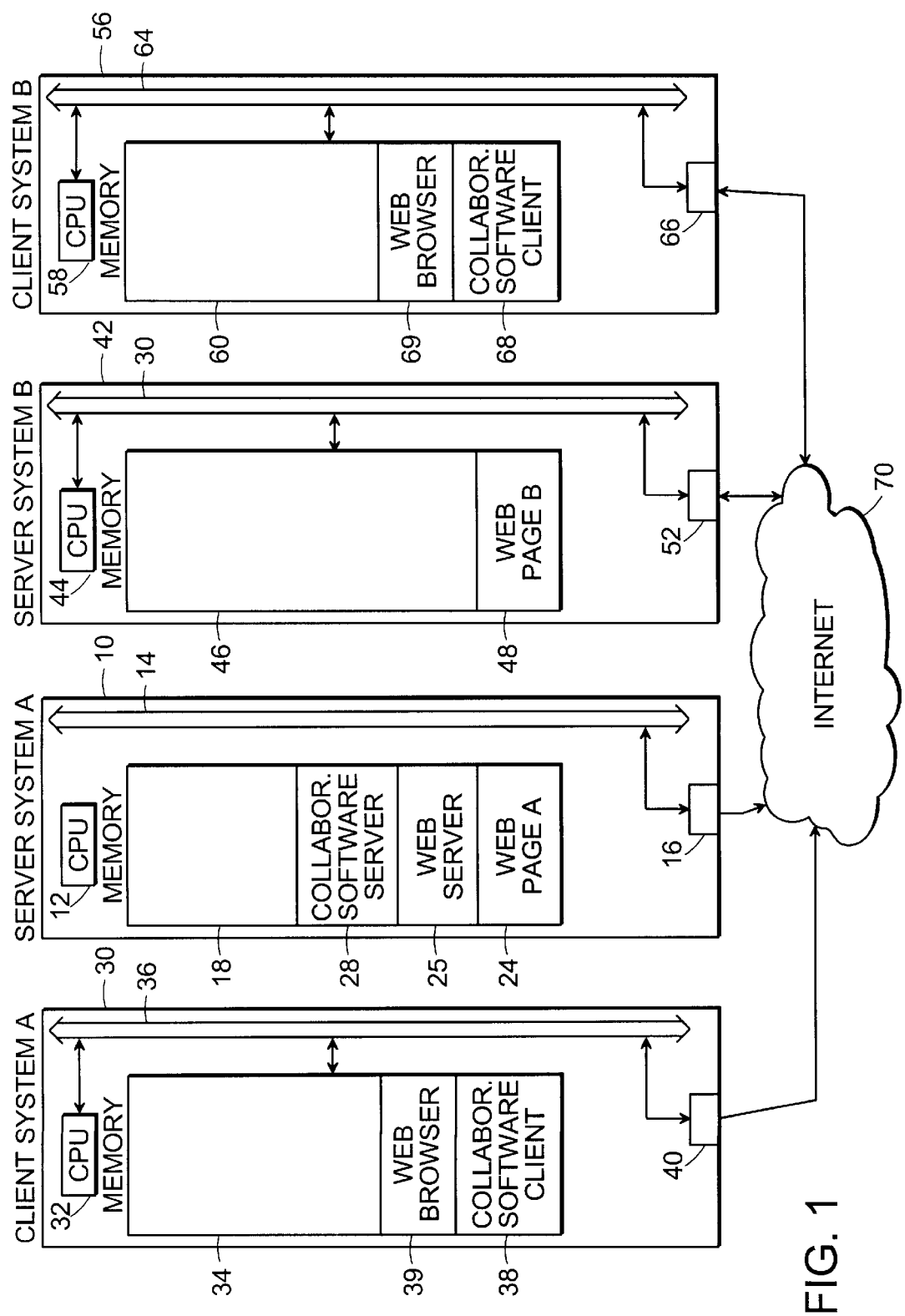
FIG. 1 is a block diagram showing hardware and software elements of an example execution environment for the disclosed system.

Now with reference to the elements of FIG. 1, there is described an example embodiment of the disclosed system for inter-program communications. FIG. 1 shows a Collaboration Software Client 38, which may include one or more applets, and which may be downloaded, for example under control of a Web Browser program 39, from a Server System A 10. The Server System A 10 is described solely for purposes of example as including conventional computer hardware components on which is running a particular Web Server Program 25. The Client System A 30 onto which the program is loaded includes for example conventional computer hardware components as well as the Web Browser 39. Applets within the Collaboration Software Client 38 implement a security policy which prevents the applets from making a network connection, for example a socket connection under TCP/IP, with a system other than the Server System A 10. The Collaboration Software Client 38 is for example embedded in a Web Page A 24 associated with a user of the Client System A 30.

FIG. 1 further shows a second Collaboration Software Client 68, for example including a number of applets, that is downloadable from a Server System B 42 to a Client System B 56. The Client System B 56 is, for example, a second client system, distinct from Client System A 30 onto which the first program was downloaded. The applets within Collaboration Software Client 68 also implement a restrictive security policy which prevents the applets from making a network connection with a system other than the Server System B 42. The Collaboration Software Client 68 is, for example, embedded in a Web Page B 48 associated with a user of the second Client System B 56.

Figure 2:
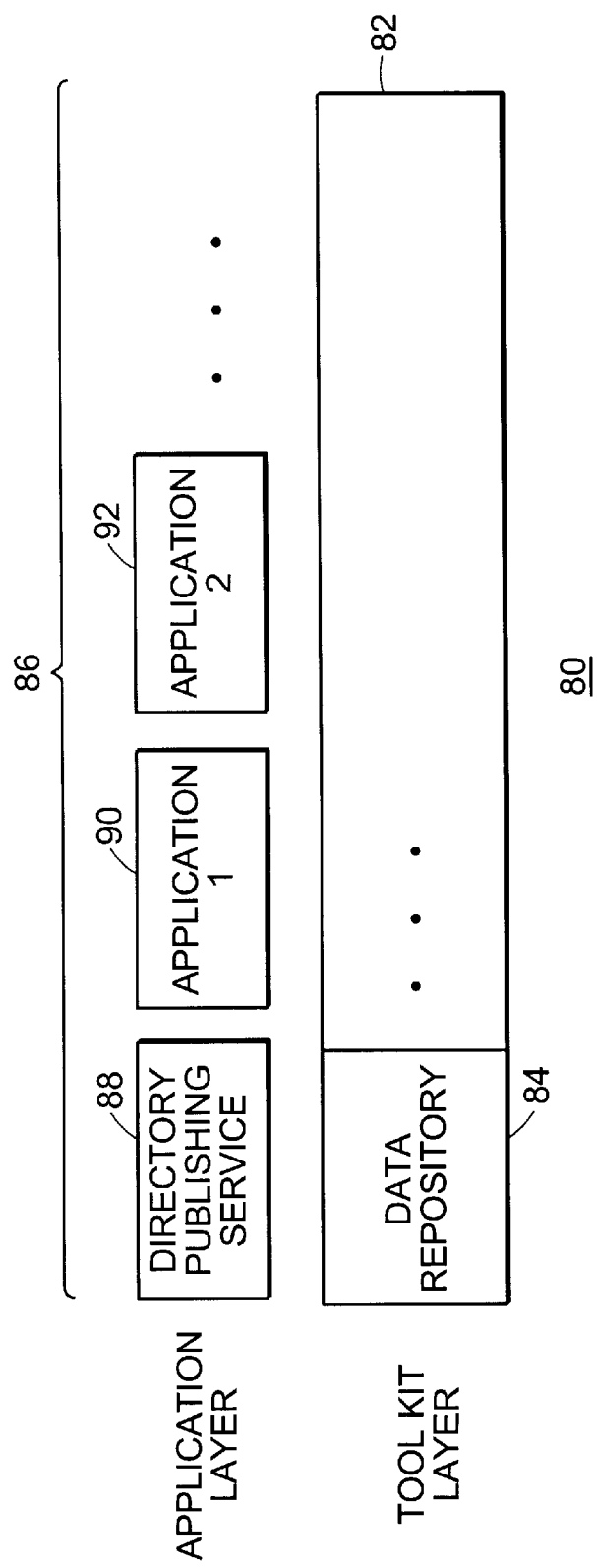
FIG. 2 is a block diagram showing software elements in an example embodiment of a collaboration software server.

Now with reference to the elements of FIG. 2, a collaboration software program is further disclosed, which provides both a data repository and a directory publishing service. The collaboration software program for example includes a Collaboration Software Server 80 which includes a Data Repository 84, and which builds user specific web pages in response to browser requests. The Collaboration Software Server 80 executes, for example, on the Server System A 10, as shown in FIG. 1. The Collaboration Software Server 80, for example, corresponds to the Collaboration Software Server 28, as shown in FIG. 1. The collaboration software program further includes a number of client parts, for example capable of processing HTML and embedded applets, which execute on a number of client systems.

For example, the client parts of a collaboration software program are shown as Collaboration Software Client 38 and Collaboration Software Client 68, as shown in FIG. 1. In the example embodiment of FIG. 1, the Collaboration Software Client 38 and any applets it includes execute in the same execution context as the Web Browser 39. Similarly, the Collaboration Software Client 68 and any applets it includes execute in the same execution context as the Web Browser 69.

The Collaboration Software Clients 68 and 38 communicate with Collaboration Software Server 28 via in-band and out-of-band messages. For example, those messages sent using an established application layer protocol from one of Collaboration Software Clients 68 or 38 to a closely coupled sever application in an Application Layer 86 of the Collaboration Software Server 80 are "in-band" messages. For example, where the Collaboration Software Client 38 contains an internet "chat" client applet associated with an internet "chat" server application in the Application Layer 86 of the Collaboration Software Server 80, those messages sent between that applet within the Collaboration Software Client 38 and the internet "chat" server application in the Collaboration Software Server 80 are considered to be "in-band" messages. Such in-band messages in the case of an internet "chat" client would then typically be forwarded by the internet "chat" server application to other internet chat clients. In an example embodiment, such in-band messages are sent directly from the Collaboration Software Client 38 to the application in the Collaboration Software Server 80 through a TCP/IP socket reserved for Internet Relay Chat (IRC). Further in the example embodiment, the established application layer protocol is an extended version of the conventional Internet Relay Chat (IRC) protocol as disclosed in RFC 1459, "Internet Relay Chat Protocol", by Jarkko Oikarinen, May 1993. Accordingly, in the example embodiment, in-band messages support the Internet Relay Chat Protocol functions. Further in the example embodiment, the internet "chat" client applets are extended to provide additional in-band messages to support voting and whiteboard capabilities.

Out-of-band messages are not sent by the internet "chat" client applet within the Collaboration Software Client to the internet "chat" server application within the Collaboration Software Server 80. Instead, the internet "chat" client applet within the Collaboration Software Client sends out-of-band messages to other applications in the Application Layer 86 of the Collaboration Software Server 86. For example, the internet "chat" client applet sends two out-of-band messages: (1) an "invitation" message, and (2) an "request" message for obtaining a list of potential invitees.

The internet "chat" client sends the out-of-band request message to a predetermined application, for example indicated by the URL of that predetermined application, where the predetermined application is other than the internet "chat" server application, and where the predetermined application is within the Application Layer 86 of the Collaboration Software Server 80. The URL of the predetermined application for example indicates a Collaboration Software Dispatcher (see FIG. 3) as well as the name of the predetermined application. The Collaboration Software Dispatcher processes the fields necessary to locate the predetermined application. Accordingly the URL is parameterized with the name of a predetermined application layer program in the Collaboration Software Server 80 that will return a list of users.

For example, in one embodiment, the code necessary to handle out-of-band messages is present in a number of applications within the Application Layer 86 of the Collaboration Software Server 80. When the internet "chat" client is an applet and accordingly downloaded from a server system, it receives the location (URL) of one of those applications within the Application Layer 86, based on the current display context of the client system. For example, where the current display includes in part a portion provided by one of the applications within the Application Layer 86, then if an internet "chat" client is downloaded from the same server as the Collaboration Software Server 80, the location (URL) of that one of the applications within the Application Layer 86 is downloaded with the internet "chat" client.

A Directory Publishing service is further shown included within the Collaboration Software Server 80. The Directory Publishing Service 88 stores the names of users of client systems having collaboration software clients, such as Client System 30 and Client System 56 in FIG. 1. When an application in the Application Layer 86 of the Collaboration Software Server 80 receives a request from an applet within a Collaboration Software Client, for example via a TCP/IP connection between a client system and the server, it uses the Directory Publishing Service 88 to provide a list of user names. In response to receipt of the list of user names from the directory publishing procedure, a display procedure within the requesting applet displays the list of user names through, for example, a dialog box. Then, by means of a user input procedure, the applet receives from the user of the client system indication of a selected one of the user names and a message to be sent to that user, for example, a user of a remote client system.

The disclosed system further includes an invitation message transmitting procedure, within for example the internet "chat" client applet, that transmits the inputted message, with the selected one of the user names to the Collaboration Software Server 80 of the collaboration software program. A message polling mechanism is included within a message posting applet, also within the Collaboration Software Client, for downloading an invitation message from the server part of the collaboration software program.

In the example embodiment of the Collaboration Software Server Part 80, shown in FIG. 2, the Directory Publishing Service 88 is incorporated in a number of applications within an Application Layer 86. Other example applications within the application layer of the Collaboration Software Server 80 (shown as Application 1 90 and Application 2 92) include for example a calendar application, a message filtering application, and a document publishing application. The calendar application for example permits users to enter a set of scheduled events, and then presents those events in a calendar format. One or more of the applications in the application layer of the Collaboration Software Server 80 are for example network application servers, and consists of a set of functions, each responding to a different user input. Each of the applications is modularly organized.

Further in the example embodiment shown in FIG. 2, the Data Repository 84 is shown for example as part of a tool kit layer. The Data Repository 84 shown in FIG. 2 is for example a built in database used to store various object instances. The example database is a relational model with an object hierarchy relationship facility available to those applications which require it.

Figure 3:
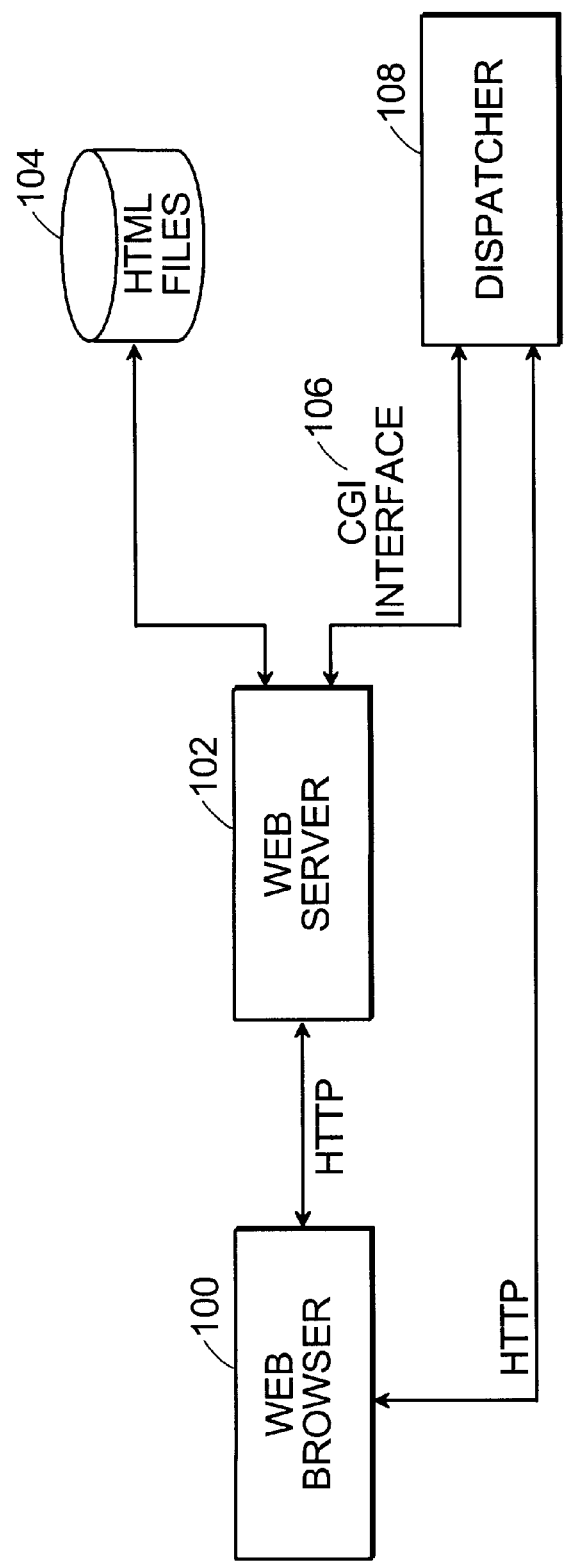
FIG. 3 is a block diagram showing elements in an example embodiment of a collaboration software system, a web browser, and a web server.

Now with respect to FIG. 3, there is described an example of the Collaborative Software Server 80 operating in conjunction with a Web Browser 100 and a Web Server 102. As is conventional, the Web Browser 100 submits requests to the Web Server 102 whenever a user opens a link. When the link points to a file, then the Web Server 102 sends the file to the Web Browser 100. The link may also point to programs on a server; in that case, the Web Server 102 invokes the program and the program responds to the user.

In the example embodiment, when the link points to the Collaboration Software Server 80, the Web Server 102 invokes a Dispatcher 108 through a Common Gateway Interface 106. Based on the information passed along with the user request, the Dispatcher 108 invokes a specific application within the Collaboration Software Server 80, which, in turn, calls various tools in the tool kit layer to respond to the user's request.

In the example embodiment, parameters are passed to the Dispatcher 108 within segments of a URL. The Dispatcher 108 parses the URL into pieces that provide the overall control of the program: (1) the name of the Collaboration Software Server 80, (2) an access control area name, (3) a message name, and (4) some number of message arguments. In the example embodiment, each user registers once with an access control area. Based on the access control area name in the URL, the Web Server 102 knows where to find the user's credential for authentication purposes and also how to authenticate the user and pass the authenticated user identity to the Collaboration Software Server 80. Given the user identity and the access control location, the Collaboration Software Server looks up the user profile, checks access control, and performs any other user specific functions. The message name and message arguments are then used by the Collaboration Software Server 80 to select particular actions to perform in one of the applications, for example as shown in FIG. 2.

Figure 4:
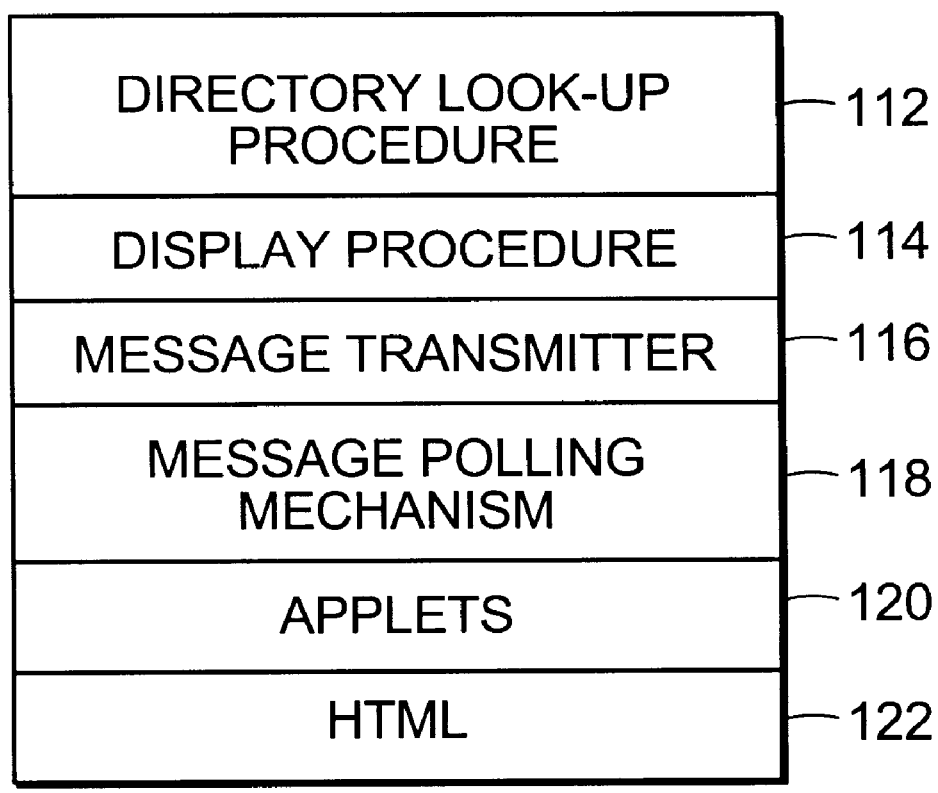
FIG. 4 is a block diagram showing elements in an example embodiment of a collaboration software client.

Now with reference to FIG. 4, there is described an example embodiment of a Collaboration Software Client 110. The example Collaboration Software Client 110 is shown including a Directory Look-up Procedure 112, which for example includes code portions for sending a message to the Collaboration Software Server 80, for example using a Message Transmitter Code Portion 116, wherein the message is either for or routed by one of the applications in the Application Layer 86 of the Collaboration Software Server 80. The Collaboration Software Client 110 is further shown to include a Message Polling Mechanism 118, for example within a Message Posting Applet, which receives messages received from the Collaboration Software Server 80, for example through a pre-determined port or TCP socket. In an example embodiment, the Message Posting Applet receives messages from a variety of sources, and general purpose message posting facility. The Collaboration Software Client 110 supports and includes various other Applets 120, Java Script and HTML portions 122.

Figure 5:
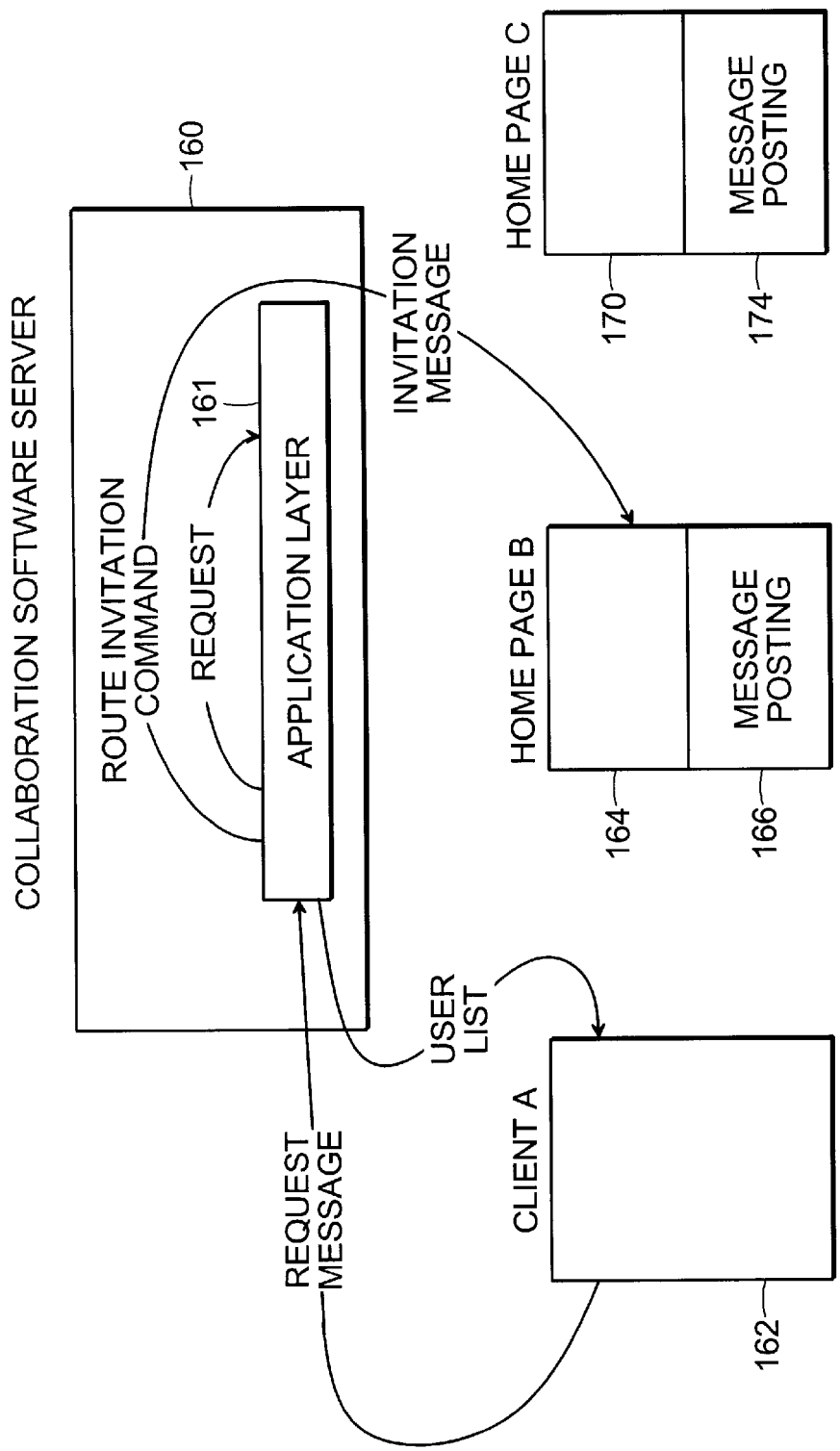
FIG. 5 is a block diagram showing the operation of the disclosed system.

FIG. 5 shows an example of operation of a Collaboration Software Client 162. A Collaboration Software Server 160 is shown, as well as Message Posting Applet 166 on a first Home Page 164 and Message Posting Applet 174 on a second home page 170. A Collaboration Software Client 162 sends a request message to a dispatcher within the Collaboration Software Server 160, which for example invokes another application using the Common Gateway Interface (CGI). For example the Collaboration Software Client 160 sends a request message through a TCP/IP socket with the server system. A Web Server program on the server system receives that message, which consists of a URL, and passes the message the the dispatcher based on the contents of the URL. The dispatcher examines the fields within the URL to determine a responding application within the Application Layer 161 of the Collaboration Software Server 160 to process the request message.

The responding application runs in the context of the Collaboration Software Server 160, with access to all functions provided by the tool kit layer of the Collaborative Software Server 160, as well as the Directory Publishing Service 88. The responding application then calls the Directory Publishing Service 88. The Directory Publishing Service 88 returns a list of users from its data repository. The responding application then returns the list of users to the Collaboration Software Client 162.

Upon receipt of the list of users, an internet "chat" client applet within the Collaborative Software Client 162 displays the list of users. The user of the client system then indicates one of the users within the list. The internet "chat" client applet in turn sends an out-of-band invitation message via the dispatcher within the Collaboration Software Server 160. The dispatcher determines an application within the Application Layer 161 of the Collaboration Software Server 160 to route the invitation message. For example, the same application within the Application Layer 161 is selected to route the invitation message as was selected to return the user list.

Within the Application Layer 161, there is included a message store. The invitation message is initially routed by the application within the Application Layer 161 by adding the invitation message to the message store. Each message includes fields indicating what type the message is, for example an invitation to chat, as well as other information such as the subject of the proposed "chat session", and a "chat channel" on which can be found the person sending the invitation to chat.

Message Posting Applets 166 and 174 periodically check the message store within the Application Layer 161 to determine if any new messages have been posted for their client. Messages which may be posted in the message store include chat invitation messages, collaboration software status, calendar event notifications, and inter-user messages. Each Message Posting Applet 166 and 174 includes a set of message filtering and display rules. The Message Posting Applet displays any new messages which satisfy its current filtering rules. For example, where the message is an invitation to chat, the Message Posting Applet may invoke a new internet "chat" client applet in response to a user input, for example in response to a double click on the displayed invitation.

Figure 6:
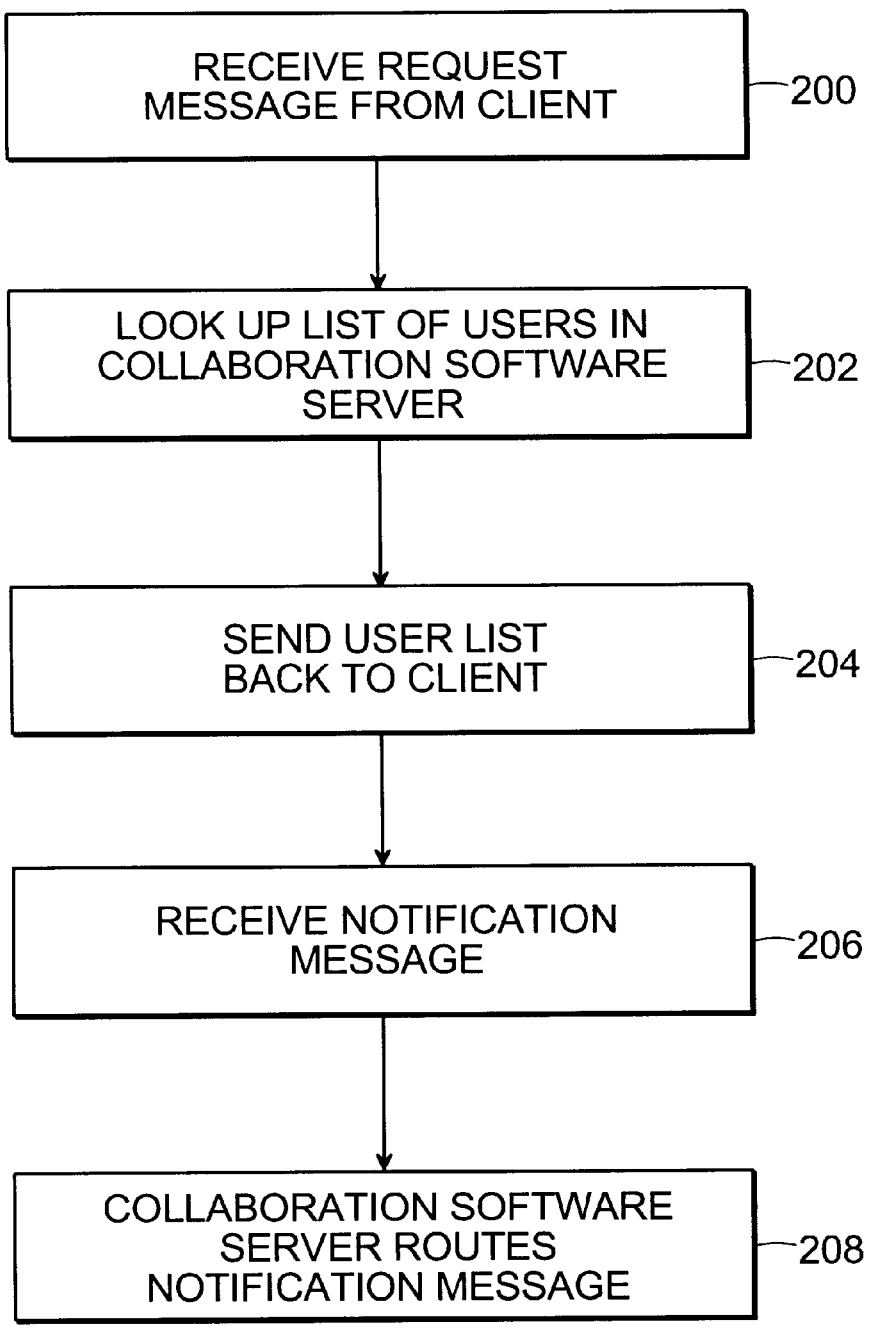
FIG. 6 is a flow chart showing an example embodiment of steps performed by the disclosed collaboration software server.

FIG. 6 shows steps performed by an example embodiment of the disclosed system as shown in FIG. 5. At step 200 a Web Server program receives a request message from the Collaboration Software Client and forwards it to the dispatcher within the Collaboration Software Server. At step 202 a responding application in the application layer of the Collaboration Software Server looks up a list of current users using the Directory Publishing Service. The responding application then sends the user list to the requesting client at step 204. At step 206, the Collaboration Software Server receives an invitation message from the client including an indicated one of the users in the list of current users. At step 208 a network application server within the Collaboration Software Server routes the notification message to the indicated user, for example by posting the message to a message store formed using the database functions provided by the tool kit layer within the Collaboration Server Software.

Figure 7:
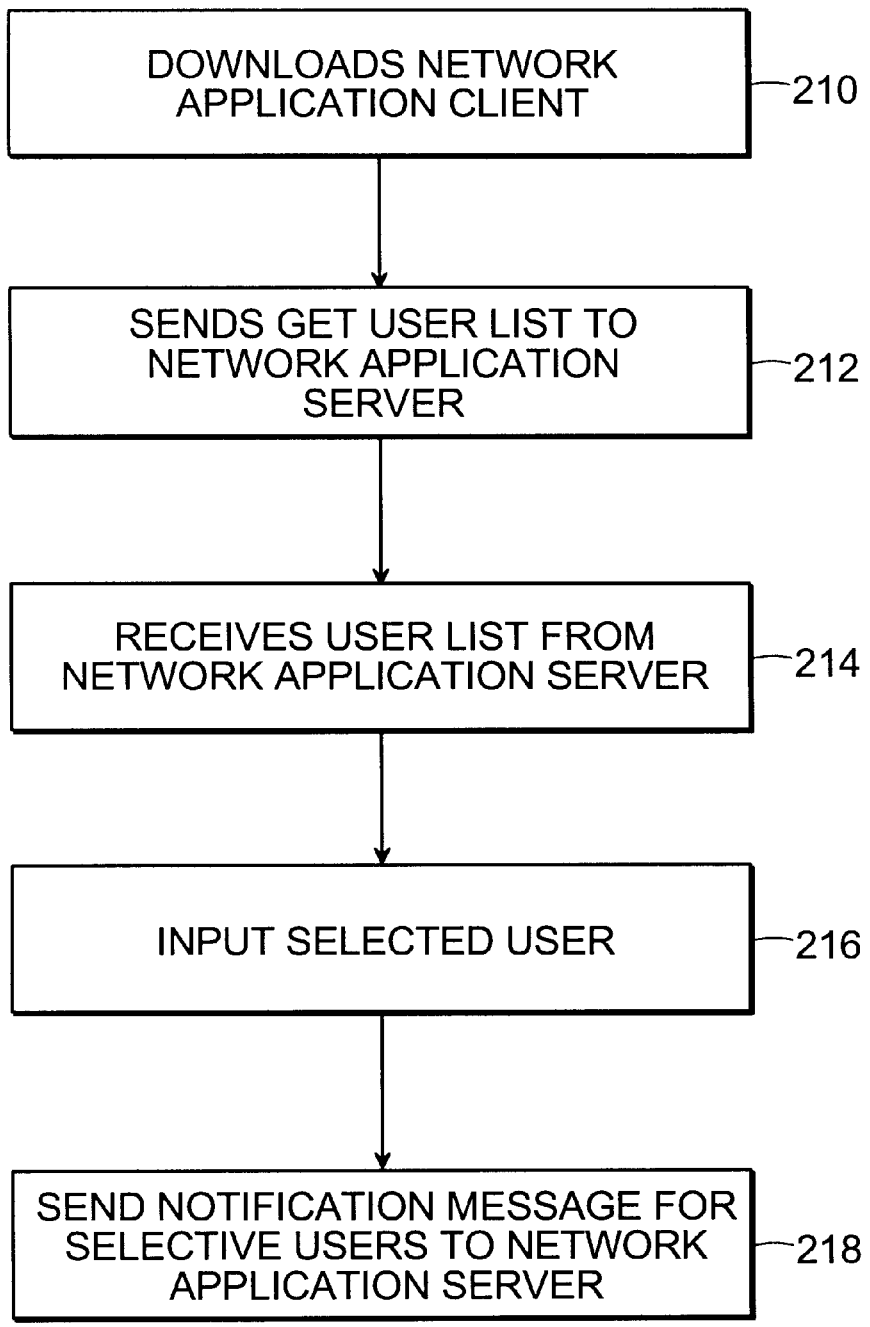
FIG. 7 is a flow chart showing an example embodiment of steps performed by the disclosed client system to send a notification or invitation message.

FIG. 7 shows steps performed by an example embodiment of the Collaboration Software Client 110 as shown in FIG. 4. At step 210, the Collaboration Software Client downloads a network application client for example including one or more applets such as an internet "chat" client applet. At step 212 the Collaboration Software Client sends a request message to the Collaboration Software Server. At step 214 the Collaboration Software Client receives a user list from the Collaboration Software Server, and displays the list of users. At step 216 the Collaboration Software Client inputs a selected user from the local user, for example by the local user double clicking on one of the users names in the displayed list of users. At step 218 the Collaboration Software Client sends a invitation or notification message through the Collaboration Software Server.

Figure 8:
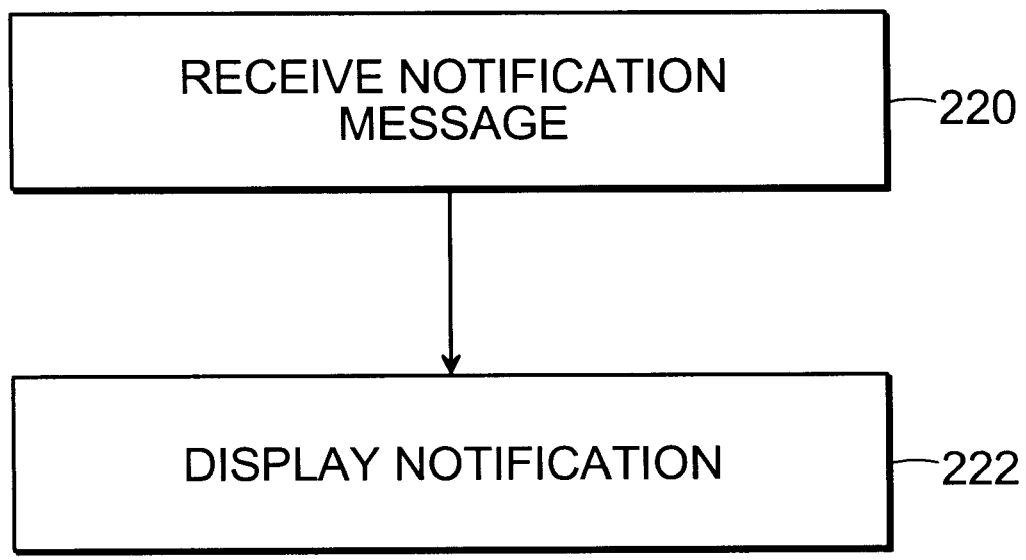
FIG. 8 is a flow chart showing an example embodiment of steps performed by the disclosed client system receiving a notification or invitation message.

FIG. 8 shows the steps performed by an example embodiment of the Collaboration Software Client in response to receipt of a notification or invitation message. At step 220, the notification is received. At step 222 the Collaboration Software Client displays a notification, for example through a dialog box presented by a message posting applet in the screen display of the local web-browser program.

While this invention has been described with reference to specific embodiments, this description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A system for communicating between computer programs, comprising:

a first program downloadable from a first server computer system to a first client computer system, said first program implementing a security policy which prevents said first program from communicating with a second client computer system;

a second program downloadable from a second server computer system to said second client computer system;

a collaboration software program, including a server part and a number of client parts, said server part including a number of network applications, wherein a first of said number of network applications is a network application server closely coupled with said first program, said client parts including said first program and said second program;

a directory publishing procedure, within said server part of said collaboration software program, that stores a list of user names and corresponding addresses;

a directory look-up procedure within said first program, that transmits a request message to said directory publishing procedure to obtain said list of user names;

a user input procedure, that receives indication of a selected one of said user names and a message to be sent to a user associated with said selected one of said user names;

a message transmitting procedure, within said first program, that transmits said message, with said selected one of said user names to a second one of said number of network applications, wherein said second one of said number of network applications posts said message into a message store in said server part of said collaboration software program; and a message polling mechanism, within said second program, for pulling said message from said message store in said server part of said collaboration software program.

2. The system as in claim 1, wherein said message is an invitation to participate in a internet chat program group.

3. The system as in claim 1, wherein said message is a notification.

4. The system as in claim 1, wherein said first server is the same as a second server from which said second program is downloaded.

5. The system as in claim 1, wherein said first program is embedded in a first web page, said first program executed on said first client system when said first web page is downloaded from said first server computer system.

6. The system as in claim 1, wherein user names are stored in the collaboration software server part by storing of URLs of home pages associated with users.

7. The system as in claim 1, wherein said second program is embedded in a second web page, said second program executed on said second client system when said second web page is downloaded from said second server computer system.

8. The system as in in claim 1, wherein said first program is an applet.

9. The system as in claim 1, wherein said second program is an applet.

10. The system as in claim 1, wherein said first program is downloadable under control of a web program.

11. The system as in claim 1, wherein said second program is downloadable under control of a web browser program.

12. The system as in claim 1, wherein said server part of said collaboration software program executes on said first server system.

13. The system as in claim 1, wherein said second program implements a security policy which prevents said second program from communicating with said first client computer system.

14. The system as in claim 1, wherein said client part includes one or more HTML instructions.

15. The system as in claim 1, wherein said corresponding addresses stored by said directory publishing procedure are URLs of home pages of the corresponding users.

16. The system as in claim 1, further comprising a display procedure within said first program, that displays said list of user names received from said directory publishing procedure.

* * * * *